United States Patent [19]

Morioka et al.

[11] Patent Number: 4,972,272
[45] Date of Patent: Nov. 20, 1990

[54] MULTI-CHANNEL VIDEO TAPE RECORDER/PLAYER HAVING MULTIPLE PAIRS OF VIDEO HEADS

[75] Inventors: Yoshihiro Morioka, Neyagawa; Masaaki Kobayashi, Kawanishi; Yoshitomi Nagaoka, Neyagawa, all of Japan

[73] Assignee: Matsushita Electric Industrial Co., Ltd., Osaka, Japan

[21] Appl. No.: 290,197

[22] Filed: Dec. 27, 1988

[30] Foreign Application Priority Data

Dec. 29, 1987 [JP] Japan .................. 62-334333

[51] Int. Cl.[5] .................. H04N 9/80; H04N 5/782
[52] U.S. Cl. .......................... 358/330; 360/64
[58] Field of Search .............. 358/12, 14, 15, 316, 358/323, 327, 335, 330, 334, 328; 360/33.1, 64, 63, 22, 23

[56] References Cited

U.S. PATENT DOCUMENTS

| | | | |
|---|---|---|---|
| 4,740,847 | 4/1988 | Watanabe | 360/64 |
| 4,743,977 | 5/1988 | Yoshioka | 358/310 |
| 4,752,830 | 6/1988 | Hickok | 358/310 |
| 4,761,690 | 8/1988 | Yamanishi | 358/310 |
| 4,775,897 | 10/1988 | Umemoto | 358/310 |
| 4,791,495 | 12/1988 | Umemoto | 358/310 |
| 4,796,096 | 1/1989 | Sakura | 358/310 |
| 4,811,117 | 3/1989 | Morioka | 358/310 |
| 4,843,485 | 6/1989 | Reitmeier | 358/310 |

FOREIGN PATENT DOCUMENTS

| | | |
|---|---|---|
| 0129393 | 12/1984 | European Pat. Off. . |
| 0224321 | 6/1987 | European Pat. Off. . |
| 0232627 | 8/1987 | European Pat. Off. . |
| 0241214 | 10/1987 | European Pat. Off. . |
| 3545921 | 6/1987 | Fed. Rep. of Germany . |
| 58-131885 | 2/1982 | Japan . |
| 59-4279 | 6/1982 | Japan . |
| 59-34785 | 8/1982 | Japan . |
| 59-104886 | 12/1982 | Japan . |
| 59-104887 | 12/1982 | Japan . |

OTHER PUBLICATIONS

"A ½ Inch Metal-Cassette VTR System", Shinya Matsuda et al., pp. 19–24.
"Betacam", pp. 872–890.

Primary Examiner—Donald McElheny, Jr.
Attorney, Agent, or Firm—Wenderoth, Lind & Ponack

[57] ABSTRACT

N-channel component signals ($N \geq 3$) of a video signal is recorded and reproduced by N pairs of magnetic heads in any tape speed mode. The N pairs of heads are mounted on a circumference of a rotary cylinder so as to be disposed in the rotating direction of the rotary cylinder at substantially constant intervals of (180/N) degrees with each pair of heads being disposed to be apart by substantially 180 degrees from each other. The relative heights of the heads in each pair in an axial direction of the rotary cylinder are substantially the same. The widths of the N pairs of heads are substantially the same. Signal timings are adjusted by delay circuits before recording and after reproduction.

13 Claims, 10 Drawing Sheets

MULTI-CHANNEL VIDEO TAPE RECORDER/PLAYER HAVING MULTIPLE PAIRS OF VIDEO HEADS

BACKGROUND OF THE INVENTION

1. Field of the Invention

This invention relates to a video tape recorder (VTR), and more particularly to a multi-channel VTR which records a video signal separated into N channel components (N being a number larger than two) on a magnetic tape and then reproduces the recorded signal.

2. Description of the Prior Art

Conventional 2-channel VTRs are widely used for broadcasting and recording video signals on a magnetic tape via two pairs of rotary heads in such a manner that a frequency modulated (FM) luminance signal Y and a FM chrominance signal C are recorded on separate tracks which are arranged alternately in the order of Y, C, Y, C, Y, C,—. The FM chrominance signal is a signal which is obtained by time-base-compression-multiplexing two chrominance difference signals and frequency-modulating the multiplexed signal, or a signal which is obtained by frequency modulating two chrominance difference signals with different carrier frequencies and mixing the frequency-modulated signals (so-called frequency-division-multiplexed signal), or a signal which is obtained by frequency-modulating so-called line sequential chrominance difference signals which appear alternately at a cycle of one horizontal scanning period. These are disclosed in Japanese Laid-Open patent application (Kokai) Nos. 59-4279, 59-34785, 58-131885, 59-104886 and 59-104887. Each pair of heads are disposed so as to be 180 degrees apart from each other on a circumference of a rotary cylinder. One head of each pair is disposed adjacent to one head of the other pair. A typical conventional 2-channel VTR is shown in "A ½ INCH METAL-CASSETE VTR SYSTEM" by S. Matsuda et al., Technical Report of the Institute of Television Engineers of Japan, Vol. 9, No. 2 (May, 1985), pp. 19–24.

Although the conventional 2-channel VTRs can provide high quality video signals, they have the following disadvantages.

The conventional 2-channel VTRs operate in only one fixed operation mode, i.e., standard mode, but cannot operate in special operation modes such as a long play mode. If they were required to operate in an additional operation mode, two additional pairs of heads would have to be provided on the rotary cylinder, which would be very difficult or almost impossible.

Furthermore, the conventional 2-channel VTRs, when recording, provide a guard band between two adjacent signal tracks on the magnetic tape for eliminating crosstalk between the signals recorded on the adjacent signal tracks. This is disadvantageous for the purpose of increasing recording density.

Furthermore, since two heads are disposed adjacent to each other, production and adjustment of the head system are very difficult, and a shield plate must be provided between two adjacent heads for eliminating crosstalk between the two adjacent heads. As the result, the head system of the conventional 2-channel VTRs is too expensive to be used for home use. This is the main reason that the 2-channel VTRs have been used only for broadcasting.

Furthermore, the signal quality of the reproduced signal is too poor to be used even as a home use VTR when the bandwidth of the recording signal is wider, or when the required SN ratio is higher in the newer systems such as EDTV, HDTV.

SUMMARY OF THE INVENTION

An object of the present invention is to provide a multi-channel (N-channel, N being an integer which is larger than two) video tape recoder capable of recording and reproducing video signals in not only a standard mode but also a long mode.

Another object of the present invention is to provide a multi-channel video tape recorder capable of recording video signals on a magnetic tape with no guard band so as to thereby realize a high density recording of video signals.

Still another object of the present invention is to provide a multi-channel video tape recorder capable of recording and reproducing N-channel video signals by only N pairs of heads.

A further object of the present invention is to provide an inexpensive multi-channel video tape recorder for home use.

To achieve these objects, a video tape recorder according to the present invention comprises: recording signal processing means for processing multi-channel component signals to be N channel recordable signal; electromagnetic conversion means including N pairs of rotary magnetic heads for recording the N-channel recordable signals on a magnetic tape and for reproducing the N-channel recorded signals, each pair of the heads of the N pairs being disposed so as to be apart by 180 degrees from each other on a circumference of a rotary cylinder and apart by (180/N) degrees from each adjacent two heads; and reproduced signal processing means for processing the N-channel reproduced signal to obtain reproduced N-channel component signals.

Preferabley, the relative heights of the N pairs of heads in an axial direction of the rotary cylinder are the same so that the relative position of each signal track with respect to the other signal track on the magnetic tape will not change but are similar at any tape speed, i.e., in any operating mode of the video tape recorder.

The above and other objects, features and advantages of the invention will be apparent from the following description of the preferred embodiments taken in connection with the accompanying drawings in which:

DESCRIPTION OF THE PREFERRED EMBODIMENTS

Figure 1:
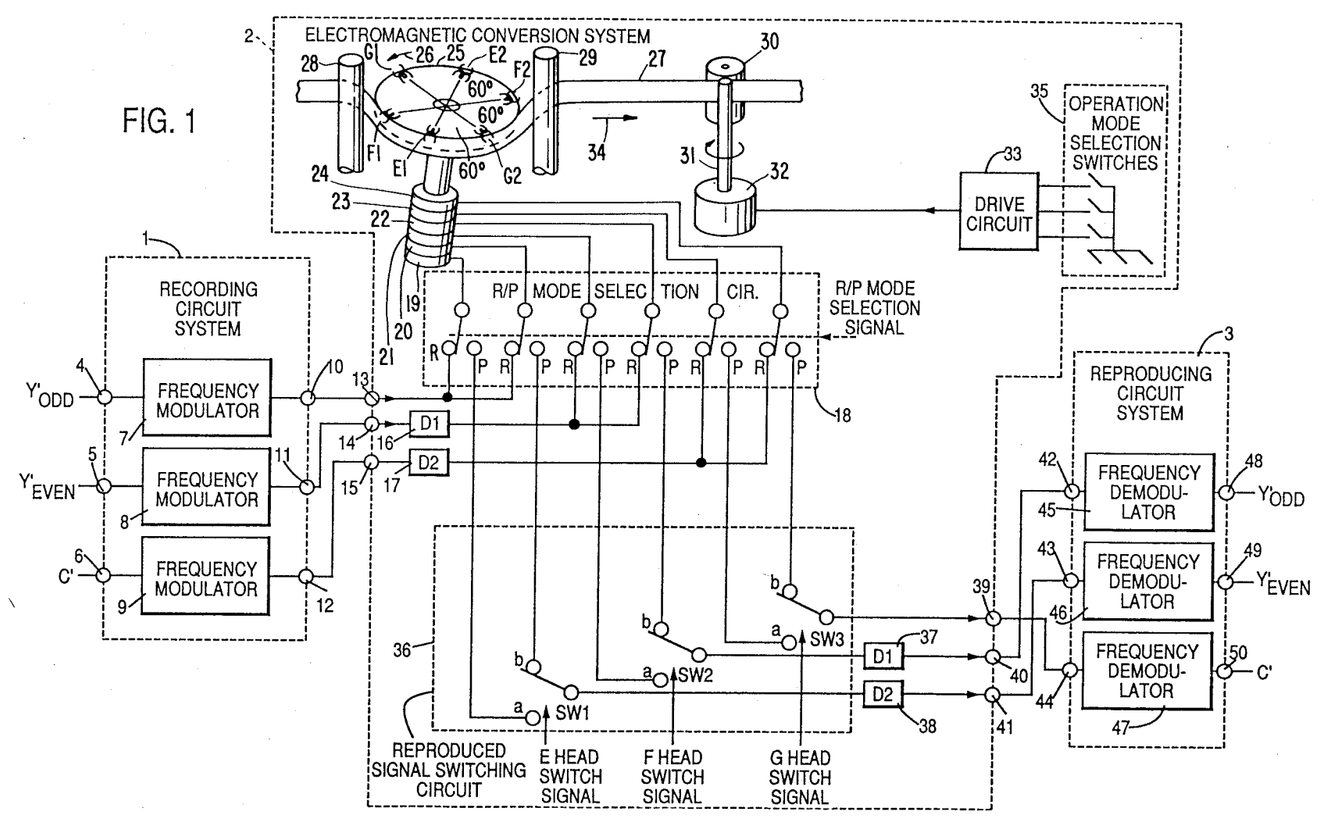
FIG. 1 is a schematic block diagram showing a three-channel component VTR embodying the present invention.

FIG. 1 shows a schematic block diagram of a three-channel video tape recorder according to the present invention. The video tape recorder in FIG. 1 comprises a recording circuit system 1, an electromagnetic conversion system 2, and a reproducing circuit system 3. Here, we consider a video tape recorder which treats an NTSC video signal. A luminance signal Y is divided into two components, a luminance signal Y'(odd) which is composed of odd line components of Y and a luminance signal Y'(even) which is composed of even line components of Y.

Figure 2:
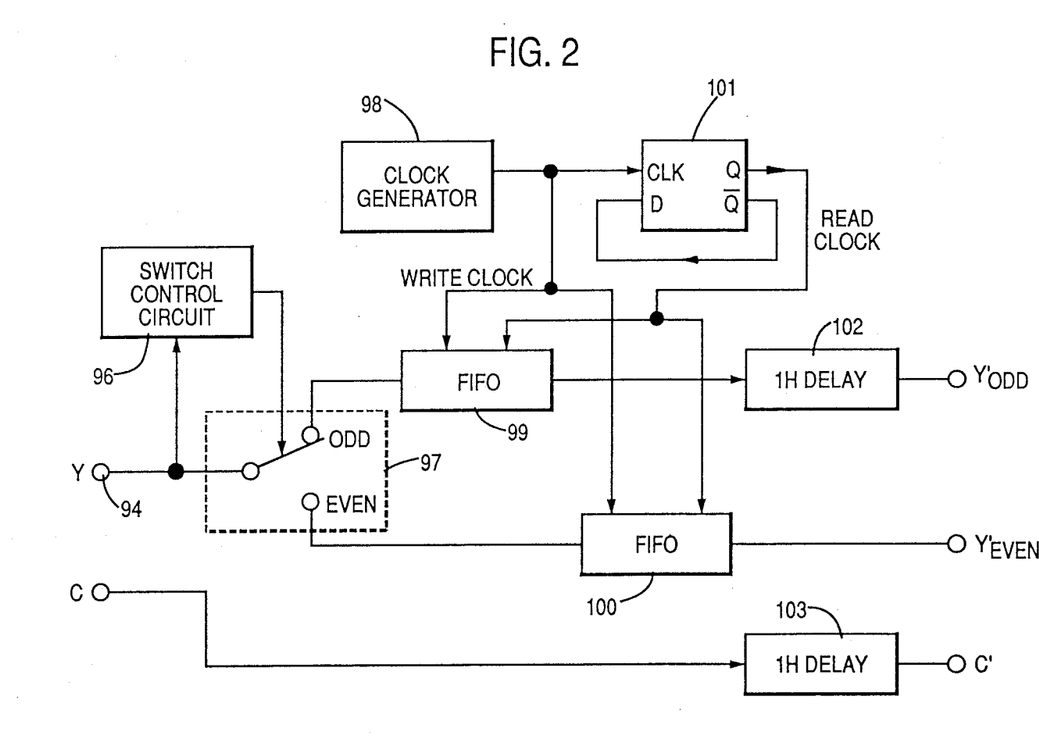
FIG. 2 is a schematic block diagram of a circuit for producing three-channel component signals from conventional two-channel component signals.
Figure 3:
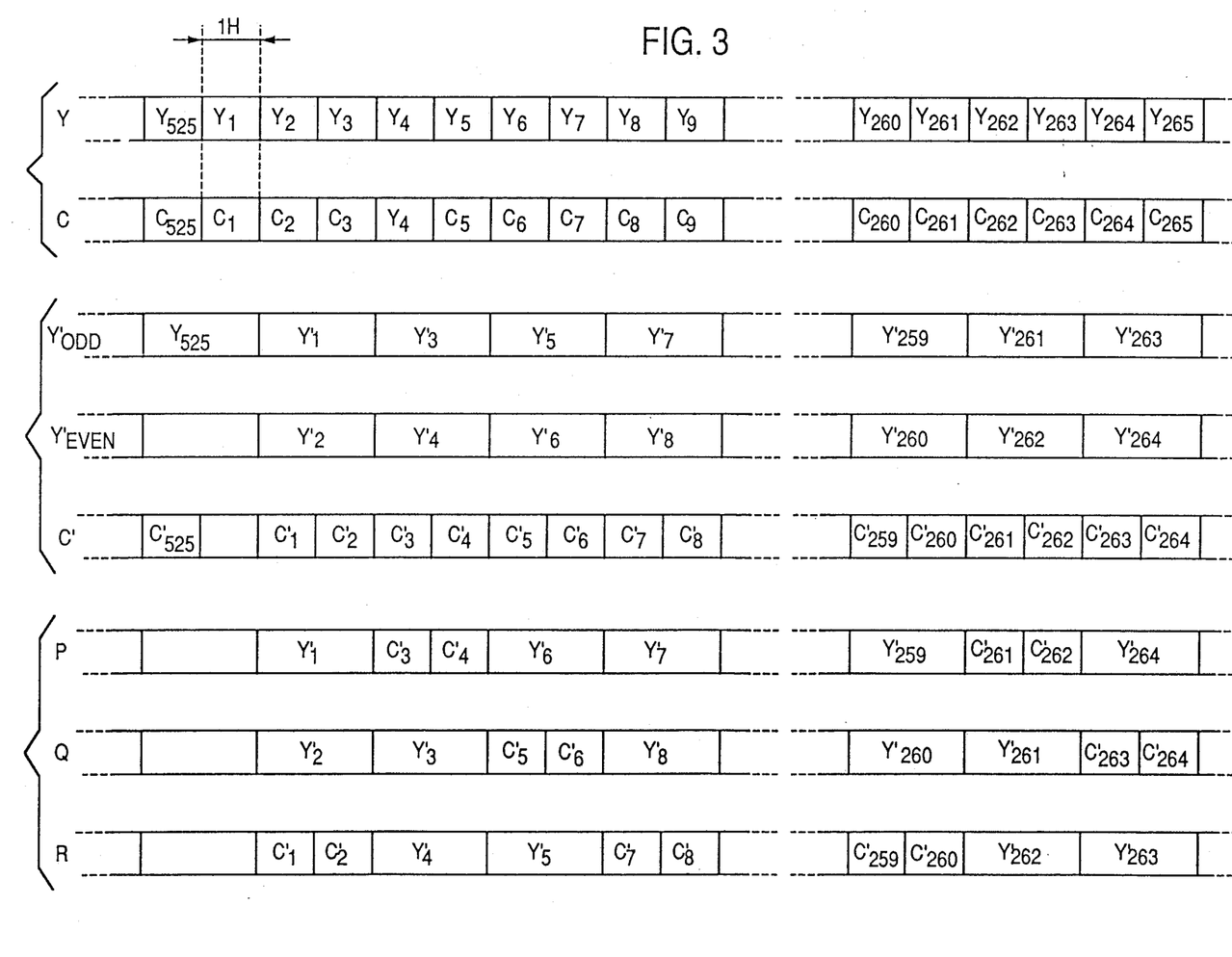
FIG. 3 shows signal conversion processes from conventional two-channel component signals to three-channel component signals, and from three-channel component signals to switched three-channel component signals.

The luminance signal Y'(odd) is applied to an input terminal 4, the other luminance signal Y'(even) is applied to an input terminal 5, and a chrominance signal C' is applied to an input terminal 6. Here, the luminance signal Y'(odd) and the luminance signal Y'(even) are obtained for example, by a signal processing circuit as shown in FIG. 2. As shown in FIG. 2, a luminance signal Y is applied to an input terminal 94 and switched by a switch circuit 97 at intervals of H, here H is a horizontal synchronizing period, into two FIFO (first-in first-out) memories 99 and 100. As is well known, a FIFO memory stores the input signal in the inputted order and outputs the stored signal in the inputted order. The switching timing is controlled by a switch control circuit 96 which may, in a known manner, separate the horizontal synchronizing signal from the input luminance signal, and produce from the separated horizontal synchronizing signal a switching signal which inverts its level between high an low at intervals of H by, for example, a D-flip-flop. A clock generator 98 generates a write sampling clock sign N for the FIFO memories 99 and 100. The clock signal is further applied to a D-flip-flop 101 to produce a read sampling clock for the the FIFO memories 99 and 100. Accordingly, the output signal of each of the FIFO memories 99 and 100 is time-expanded by double relative to the input signal. The expanded output signal of the FIFO memory 99 is delayed for 1 H by a 1 H delay circuit 102 to be the luminance signal Y'(odd). The output signal of the FIFO memory 100 is the luminance signal Y'(even) A chrominance signal C is a signal obtained by time-base-compression-multiplexing two chrominance difference signals, and has its own horizontal synchronizing signal. The chrominance signal C is delayed for 1 H by a 1 H delay circuit 103 to be the chrominance signal C'. In this way, the three-channel component signal Y'(odd), Y'(even) and C' as shown in FIG. 3 are produced.

In the recording circuit 1 of FIG. 1 the luminance signal Y'(odd), the luminance signal Y'(even) and the chrominance signal C' are respectively frequency-modulated by frequency modulators 7, 8 and 9 and outputted from output terminals 10, 11 and 12 which are respectively coupled to the input terminals 13, 14 and 15 of the electromagnetic conversion system 2.

In a recording mode, changeover switches of a record/playback (R/P) mode selection circirt 18 select R terminals in response to an externally given R/P mode selection signal. This externally given R/P mode selection signal is produced by, as is well known, for example, by the VTR system controller and becomes a high level in a record mode to select the R terminals and a low level in a playback mode to select the P terminals. Accordingly, the frequency-modulated (FM) Y'(odd) signal passes through the R/P mode selection circuit 18 to be applied to a pair of magnetic heads E1 and E2 via rotary transformers 19 and 20 which are mounted on a rotary shaft of a rotary cylinder 25. The FM Y'(even) signal is delayed for ($\frac{1}{3}$)H, where H is one horizontal scanning period, by a delay circuit (D1) 16, and thereafter passes through the R/P mode selection circuit 18 to be applied to another pair of magnetic heads F1 and F2 via rotary transformers 21 and 22 which are mounted on the rotary shaft of the rotary cylinder 25. The FM C' signal is delayed for ($\frac{2}{3}$) H by a delay circuit (D2) 17, and thereafter passes through the R/P mode selection circuit 18 to be applied to still another pair of magnetic heads G1 and G2 via rotary transformers 23 and 24 which are mounted on the rotary shaft of the rotary cylinder 25.

A magnetic tape 27 is driven by a capstan 31 rotated by a capstan motor 32 and a pinch roller 30 to move in a direction 34. The speed of the capstan motor 32 is controlled by a drive circuit 33 according to an operation mode selection signal from operation mode selection switches 35 to change the moving speed of the magnetic tape 27. The magnetic tape 27 is guided by guide posts 28 and 29 to be wound on the rotary cylinder 25 in an angle of about 180 degrees.

Figure 4A:
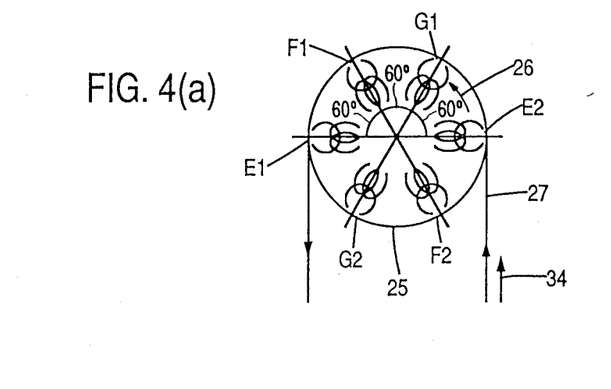
FIGS. 4(a) and 4(b) are a top view and horizontally expanded view, respectively, of six rotary magnetic heads, for showing a head arrangement according to the present invention.

Referring to FIG. 4(a) which shows a top view of the arrangement of the magnetic heads on the rotary cylinder 25, the heads E1 and E2 are spaced apart by 180 degrees from each other, the heads F1 and F2 are spaced apart by 180 degrees from each other and the heads G1 and G2 are spaced apart by 180 degrees from each other. The heads E1 and F1 are spaced apart by 60 degrees from each other. The heads F1 and G1 are spaced apart by 60 degrees from each other.

Figure 4B:
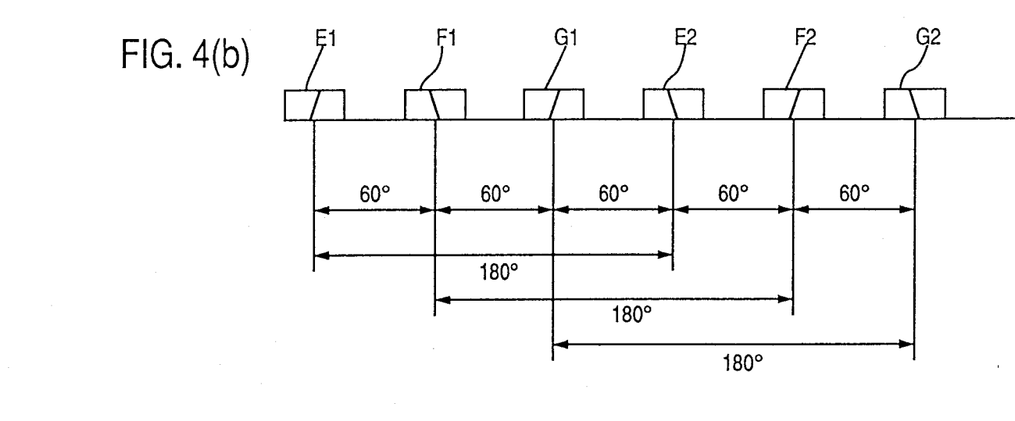

Referring to FIG. 4(b) which shows the arrangement of the magnetic heads in a rotational direction 26 thereof, all of the six heads E1, E2, F1, F2, G1 and G2 are at a same height, or rotate on a same plane. The heads E1, G1 and F2 have a same azimuth ($\alpha$), and the heads E2, G2 and F1 have another same azimuth ($\beta$) which is different from or preferably inverse ($-\alpha$) to that of the heads E1, G1 and F2. Here, all of the six heads E1, E2, F1, F2, G1 and G2 have a same width.

Slant azimuth recording is known to increase the recording density. The gaps of the recording heads for scanning adjacent tracks are tilted to each other so that a crosstalk component from an adjacent track is attenuated due to azimuth loss. The azimuth loss is greater when the signal frequency is higher, or when the signal track is wider, or when the azimuth angle difference is greater. Thus, recording density can be increased by properly selecting the signal frequency, the signal track width and the azimuth angle difference.

Figure 5:
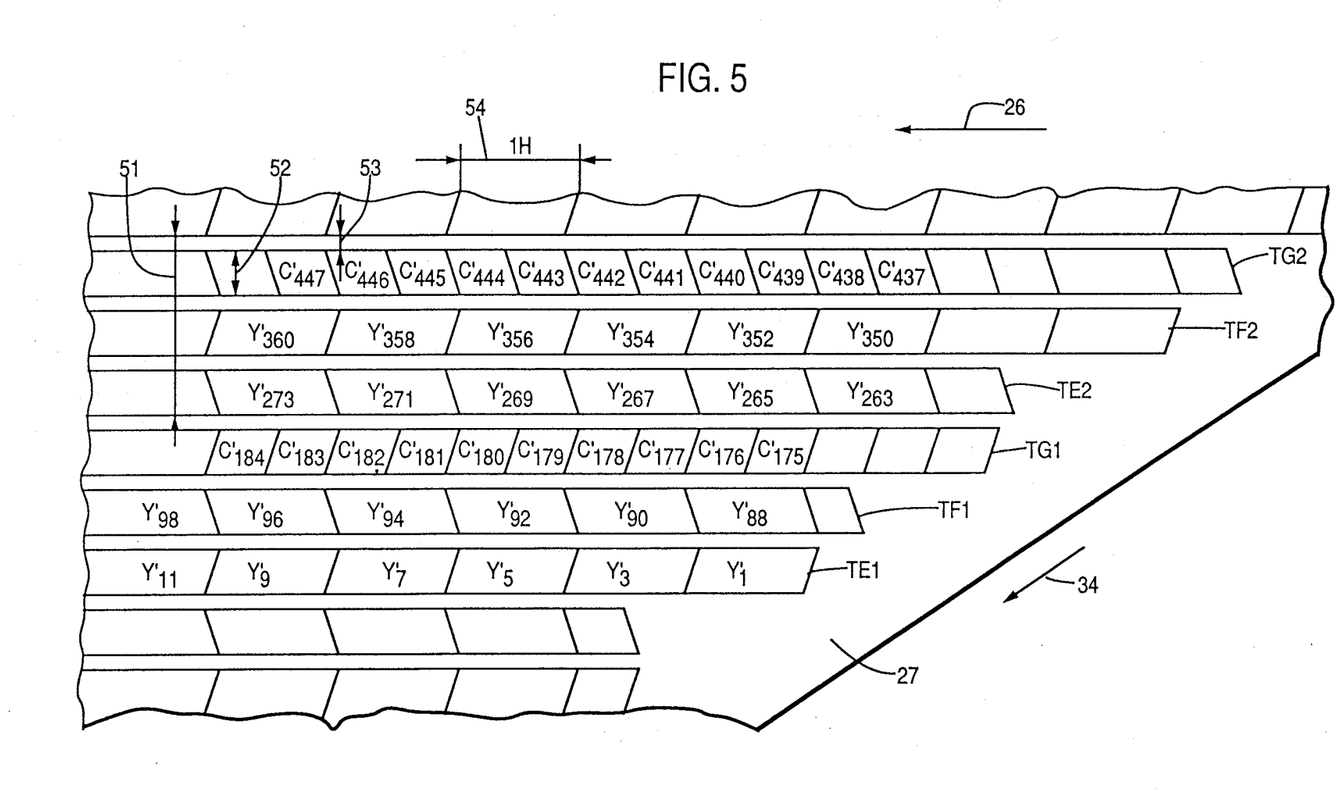
FIG. 5 is a track pattern diagram showing an example of a signal track pattern on a magnetic tape in a standard mode according to the present invention.

The rotary cylinder 25 turns a half (180 degrees) in the direction 26 in a time corresponding to one field of the NTSC video signal, during which the magnetic tape 27 is moved for a distance 51 in a direction 34 as shown in the track pattern diagram of FIG. 5.

During first through third one-sixth (69 degrees) turns of the rotary cylinder 25, the magnetic head E1 scans the magnetic tape 27 to record the FM Y'(odd) signal in a first field in each frame. During second through fourth one-sixth (60 degrees) turns of the rotary cylinder 25, the magnetic head F1 scans the magnetic tape 27 to record the FM Y'(even) signal in second and third one-third of a first field and first one-third of a second field in each frame. During third through fourth one-sixth (60 degrees) turns of the rotary cylinder 25, magnetic head G1 scans the magnetic tape 27 to record the FM C' signal in third one-third of a first field and first and second one-third of a second field in each frame. During fourth through sixth one-sixth (60 degrees) turns of rotary cylinder 25, the magnetic head E2 scans the magnetic tape 27 to record the FM Y'(odd) signal in a second field in each frame. During fifth through next first one-sixth (60 degrees) turns of the rotary cylidner 25, the magnetic head F2 scans the magnetic tape 27 to record the FM Y'(even) signal in second and third one-third of a second field and first one-third of a next first field in each frame. During sixth through next second one-sixth (60 degrees) turns of the rotary cylinder 25, the magnetic head G2 scans the magnetic tape 27 to record the FM C' signal in third one-third of a second field and first and second one-third of a next first field in each frame.

Referring to FIG. 5, the signal track TE1 is recorded by the head E1, the signal track TF1 is recorded by the head F1, the signal track TG1 is recorded by the head G1, the signal track TE2 is recorded by the head E2, the signal track TF2 is recorded by the head F2 and the signal track TG2 is recorded by the head G2. As shown in FIG. 5, there exist guard bands 53, so the track width 52 is narrower than a one-third of the distance 51. Symbols Y and C respectively indicate the luminance and chrominance signals, and each suffix indicates a horizontal line number. Numeral 54 indicates a distance corresponding to 1 H.

Figure 6:
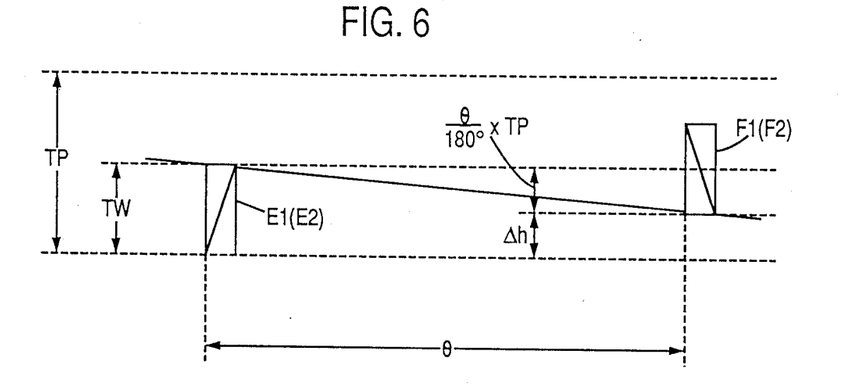
FIG. 6 is a head disposition diagram for deriving a condition which gives similar track patterns in any tape moving speed mode.

Now, consider a case in which the track pattern when the magnetic tape travels at 1/M, here M being any integer larger than 1, of the tape speed in the standard operation mode (i.e., in the case of the long play mode) becomes similar to that in the standard operation mode with reference to FIG. 6. Suppose that the angular distance (in the rotational direction) between the head E1(E2) and F1(F2) to be $\theta$ degrees, the relative height difference between the head D1(D2) and E1(E2) to be $\Delta h$, the track width in the standard mode to be TW1, the track pitch (moving distance of the tape during a 180 degree turn of the rotary cylinder) in the standard mode to be TP1, the track width in the long play mode to be TW2, and the track pitch in the long play mode to be TP2. In general, at a position in the rotational direction, the relative height difference between the head D1(D2) when passing the position and the head E1(E2) when passing the position is expressed by $\Delta h + TP \times \theta/180$ (TP: track pitch). The conditions to make the track patterns in the standard and long play modes to be similar to each other are expressed as follows:

$$\Delta h + TP1 \times \theta/180 = TW1 \quad (1)$$

$$\Delta h + TP2 \times \theta/180 = TW2 \quad (2)$$

From equations (1) and (2), the following equation is obtained:

$$\frac{\theta}{180} = \frac{TW1 - TW2}{TP1 - TP2}$$

For making the track patterns in the two modes to be similar to each other, the relations expressed as TW2=TW1/M and TP2=TP1/M should be satisfied. Thus, the following equation is obtained:

$$\frac{\theta}{180} = \frac{TW1}{TP1} = \frac{TW2}{TP2} \quad (3)$$

As described before, according to the present invention, $\theta$ and $\Delta h$ satisfy the following condition:

$$\theta = 60$$

$$\Delta h = 0 \quad (4)$$

Thus, the following result is obtained:

$$TW1 = TP\tfrac{1}{3}$$

$$TW2 = TP\tfrac{2}{3} \quad (5)$$

Figure 7:
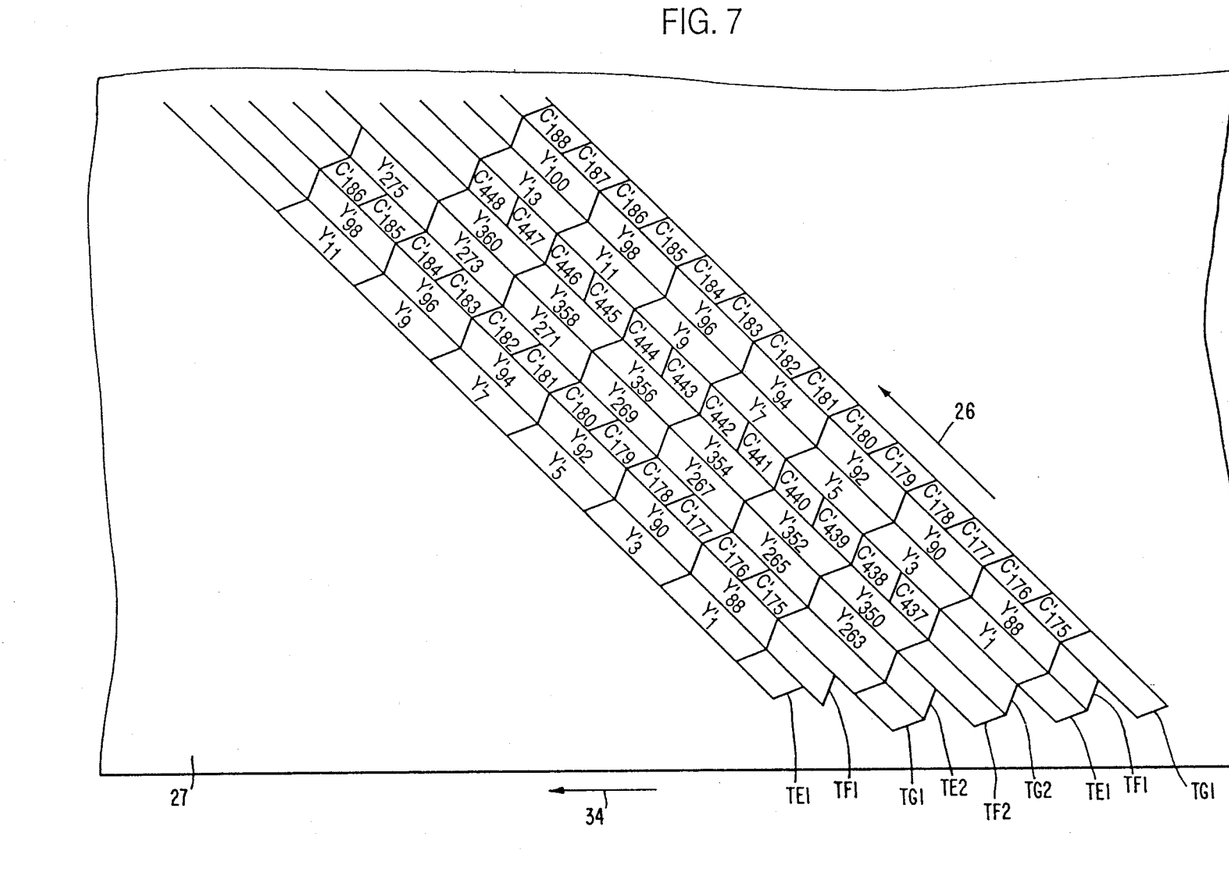
FIG. 7 is a track pattern diagram showing an example of signal track pattern on a magnetic tape in a long play mode according to the present invention.

This means that any track will not be overwritten on an adjacent other track at any tape speed in any long play mode. FIG. 7 shows an example of the signal track pattern on a record tape in a long play mode, in which tracks TE1, TF1, TG1, TE2, TF2 and TG2 are recorded by the heads E1, F1, G1, E2, F2 and G2, respectively. Since any track is not overwritten an other track, there is no danger of a track being erased or made narrower in a long play mode.

Referring again to FIG. 1, in the playback mode, the recorded signals are reproduced by the same heads as those used for recording. The changeover switches of the R/P mode selection circuit 18 select P terminals in response to the R/P mode selection signal. Accordingly, the reproduced signals from the heads E1, E2, F1, F2, G1 and G2 pass through the R/P mode selection circuit 18 and applied to a reproduced signal switching circuit 36.

A change-over switch SW1 in the switching circuit 36 is responsive to an externally given E-head switch signal which indicates which one of the heads E1 and E2 is scanning the magnetic tape for operating in such a way to select a terminal 'a' in a first field of each frame to pass the reproduced FM Y'(odd) signal from the head E1 and a terminal 'b' in a second field to pass the reproduced FM Y'(even) signal from the head E2. As is well known, the externally given E-head switch signal is produced by the VTR system controller. A charge-over switch SW2 in the switching circuit 36 is responsive to an externally given F-head switch signal which indicates which one of the heads F1 and F2 is scanning the magnetic tape for operating in such a way to select 'a' terminal in second and third one-third of a first field and first one-third of a second field to pass the reproduced FM Y'(even) signal from the head F1 and a terminal 'b' in second and third one-third of a second field and first one-third of a next first field to pass the reproduced FM Y'(even) signal from the head F2. As is well known, the externally given F-head switch signal is produced by the VTR system controller. A change-over switch SW3 in the switching circuit 36 is responsive to an externally given G-head switch signal which indicates which one of the heads G1 and G2 is scanning the magnetic tape for operating in such a way to select 'a' terminal in third one-third of a first field and first and second one-third of second field to pass the reproduced FM C' signal from the head G1 and a terminal 'b' in second and third one-third of a second field and third one-third of a next first fields to pass the reproduced FM C' signal from the head G2. As is well known, the externally given G-head switch is produced by the VTR system controller.

The reproduced FM Y'(odd) signal passed through the switch SW1 is delayed for ($\frac{1}{3}$)H by a delay circuit 38, and outputted from an output terminal 41 of the electromagnetic conversion system 2. The reproduced FM Y'(even) signal passed through the switch SW2 is delayed for ($\frac{2}{3}$)H by a delay circuit 37, and outputted from an output terminal 40 of the electromagnetic conversion system 2. The reproduced FM C' signal passed through the switch SW3 is outputted from an output terminal 39 of the electromagnetic conversion system 2.

The FM Y'(odd) signal outputted from the electromagnetic conversion system 2 is inputted to an input terminal 42 of the reproducing circuit system 3, and frequency-demodulated by a frequency demodulator 45 to be a reproduced Y'(odd) signal, which is outputted from an output terminal 48. The FM Y'(even) signal outputted from the electromagnetic conversion system 2 is inputted to an input terminal 43 of the reproducing circuit system 3, and frequency-demodulated by a frequency demodulator 46 to be a reproduced Y'(even) signal, which is outputted from an output terminal 49. The FM C' signal outputted from the electromagnetic conversion system 2 is inputted to an input terminal 44 of the reproducing circuit system 3, and frequency-demodulated by a frequency demodulator 47 to be a reproduced Y'(odd) signal, which is outputted from an output terminal 50.

Referring to FIGS. 5 and 7, on each part between the adjacent two one-field-signal recorder parts of each track is recorded a horizontal synchronizing signal which has a large power. If the horizontal synchronizing signal recorded part was adjacent to a signal recorded part in a direction perpendicular to the head moving direction 26, the horizontal synchronizing signal would cause a bad influence on the adjacent signal as a crosstalk signal. However, in the track pattern as shown in FIG. 5 and 7 obtained according to the present invention, each horizontal synchronizating signal is recorded to be adjacent to another horizontal synchronizing signal recorded part in the direction perpendicular to the head moving direction, so that the recorded FM Y'(odd), Y'(even) and C' signals will not be affected by the crosstalk of the horizontal synchronizing signal.

In the embodiment of FIG. 1 the number of channels is three, but it is possible to achieve the same effects as described when the number of channels is more than three.

Figure 8:
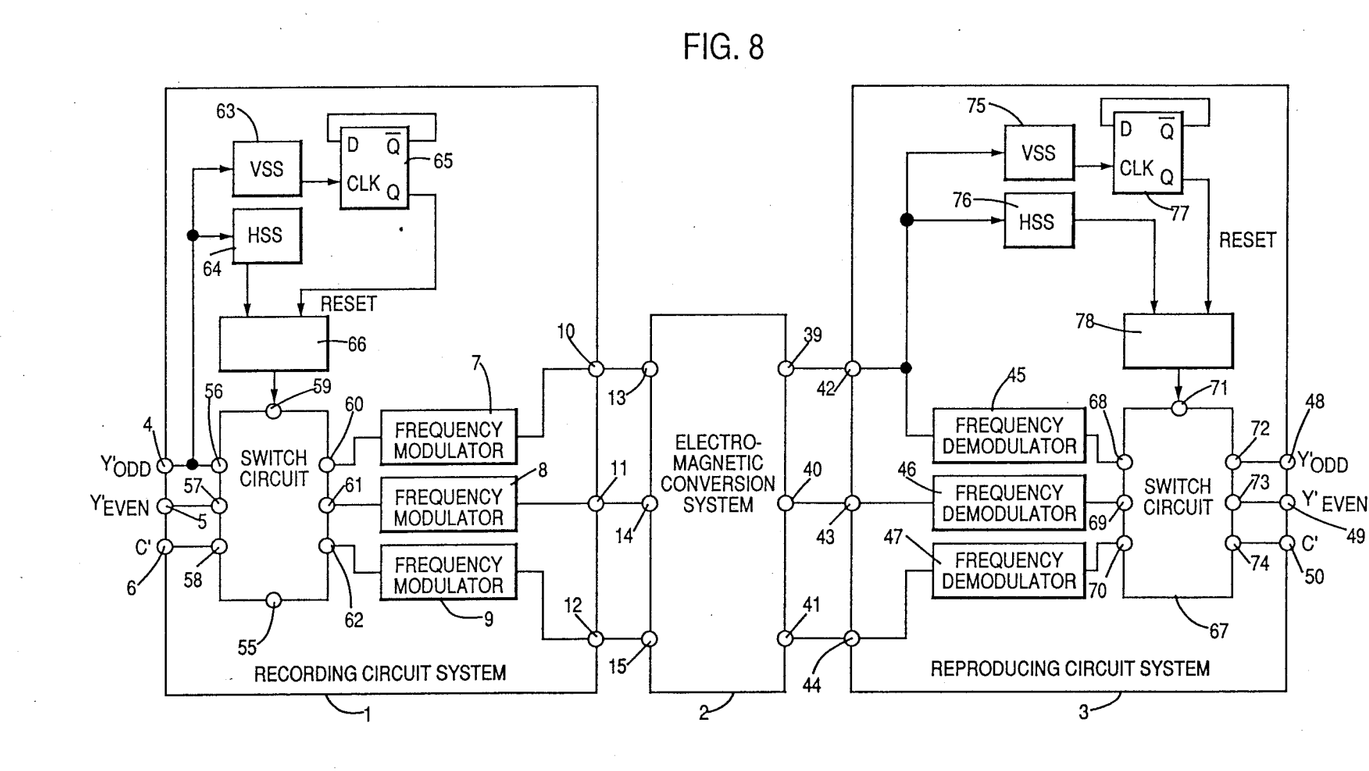
FIG. 8 is a schematic block diagram showing another three-channel component VTR embodying the present invention.

FIG. 8 shows another 3-channel video tape recorder according to the present invention, in which the electromagnetic conversion system 2 has the same configuration as that of the embodiment shown in FIG. 1. The input Y'(odd), Y'(even) and C' signal are converted to three combined signals P, Q and R as shown in FIG. 3. Each of the combined signals, P, Q and R contains Y'(odd), Y'(even) and C' signals which appear cyclically each at the period of 2 H (the cycle period is $3 \times 2H = 6$ H). After each of the three channel signals occurs during 2 H period, each of the three channel signals is replaced by one of the other two of the three channel signals in next 2 H period, and the each of the three channel signals is replaced by the other of the other two of the three channel signals in next to next 2 H period to obtain three combined signals each of which contains a sequence of the three channel signals which occurs periodically at period of 3 H. More specifically, if Y'(odd), Y'(even) and C' signals occur in m-th line (m; any positive integer), Y'(odd), Y'(even) and C' signals are respectively replaced by C', Y'(odd) and Y'(even) in (m+1)-th line, and are respectively replaced by Y'(even), C' and Y'(odd) in (m+2)-th line to obtain P, Q and R signals. In signal P, a sequence of Y'(odd), C' and Y'(even) signals occurs periodically at period 6 H. In signal Q, a sequence of Y'(even), Y'(odd) and C' signals occurs periodically at period 6 H. In signal R, a sequence of C', Y'(even) and Y'(odd) signals occurs periodically at period 6 H.

Figure 9:
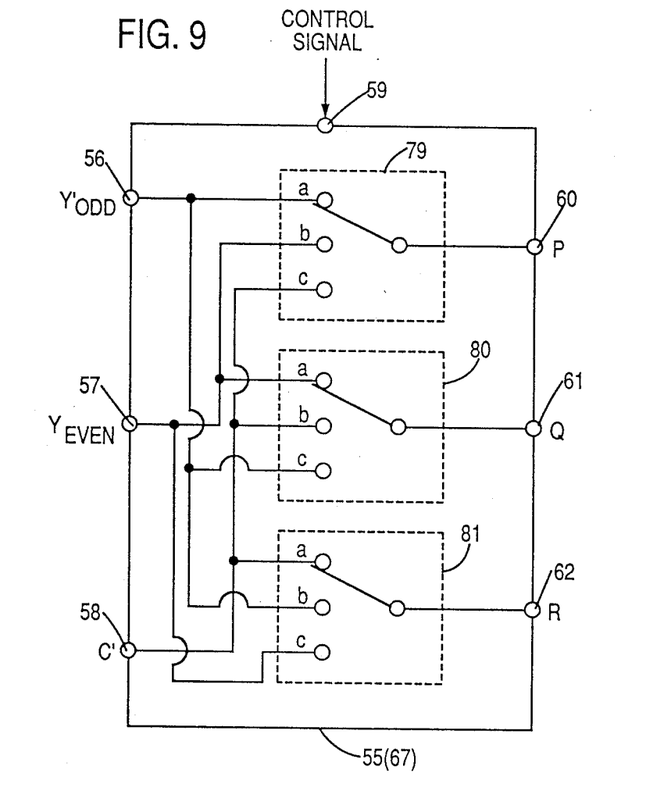
FIG. 9 is a schematic circuit diagram of a switch circuit used in the embodiment of FIG. 8.

Referring to FIG. 9, the switch circuit 55 comprises three changeover switches 79, 80 and 81 each of which is periodically changed over in response to a control signal which changes its three levels 0, 1 and 2 at intervals of 2 H. Thus, Y'(odd), Y'(even) and C' signals inputted respectively to input terminals 56, 57 and 58 are converted to the three combined signals P, Q and R which appear respectively at output terminals 60, 61 and 62.

Referring back to FIG. 8, the control signal of the switch circuit 55 is produced in a control signal producing circuit 66. Hence, the input signals of the control signal producing circuit 66 are the horizontal synchronizing (Hsync) signal and the frame synchronizing signal. The Hsync signal is made in a horizontal synchronizing signal separation (HSS) circuit 64 from the input Y'(odd) signal. The Vsync signal is made in a vertical (field) synchronizing signal separation (VSS) circuit 63 from the input Y'(odd) signal, and the frame synchronizing signal is made by D-flipflop 65 from Vsync. The output signal levels of control signal produce circuit 66 are three levels, there are, 0-level, b 1-level, 2-level. At the first line of a frame the output signal level is 0 level, and when every Hsync is inputted the output signal level is changed to 1-level, 2-level, 0-level, 1-level, 2-level, . . . . When the frame synchronizing signal is inputted, the output signal level is reset to 0-level.

The combined signals P, Q and R are respectively frequency-modulated by the frequency modulators 7, 8 and 9, and applied to the input terminals 13, 14 and 15 of the electromagnetic conversion system 2. In the electromagnetic conversion system 2, the three FM combined signals are recorded on the magnetic tape in the same way as described in connection with the embodiment of FIG. 1.

Figure 10:
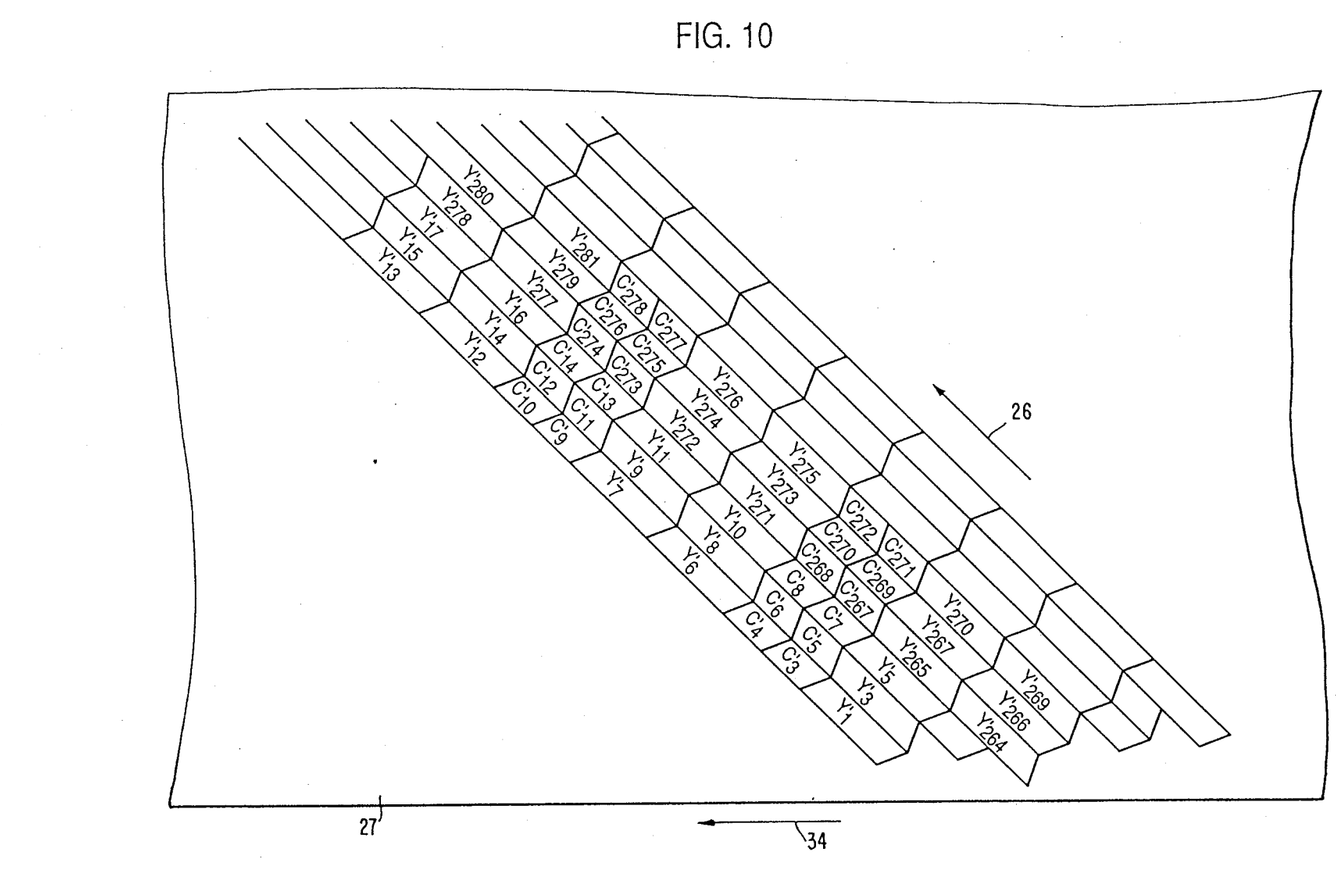
FIG. 10 is a track pattern diagram showing another example of signal track pattern on a magnetic tape in a standard mode according to the embodiment of FIG. 9.

FIG. 10 shows a track pattern showing the signal track pattern in the standard mode obtained by the embodiment of FIG. 8. The tracks TE1, TF1, TG1, TE2 and TG2 are respectively recorded by the heads E1, F1, G1, E2, F2 and G2. The parts on which a same kind of signal (Y or C) is recorded are aligned in the direction perpendicular to the head moving direction 26. In other words, a luminance signal recorded part is adjacent to another luminance signal recorded part and a chrominance signal recorded part is adjacent to another chrominance signal recorded part in the head width direction. According to the frequency modulation theory, the influence of crosstalk decreases in inverse proportion to the frequency difference from the carrier frequency. In the track pattern shown in FIG. 10, since the same kind of signal is recorded on the parts adjacent to each other in the head width direction, the influence of crosstalk is minimized. Therefore, the signals recorder on each track will hardly be affected by the crosstalk from the signals recorded on an adjacent track.

Referring again to FIG. 8, in the playback mode the recorded FM combined signals are reproduced and outputted from the output terminals 39, 40 and 41 of the electromagnetic conversion system 2 in the same way as described in connection with the embodiment of FIG. 1. The reproduced FM combined signals are frequency-demodulated by the frequency-demodulators 45, 46 and 47, and converted to reproduced Y'(odd), Y'(even) and C' signals by a circuit which comprises a switch circuit 67 having the same configuration as that of FIG. 9 and a circuit comprising a HSS circuit 76, a VSS circuit 75, a D-flip-flop 77 and a control signal producing circuit 78, which functions in the same way as the circuit comprising the switch circuit 66, the HSS circuit 64, the VSS circuit 63, the D-flipflop 65 and the control signal reproducing circuit 66.

The embodiment in FIG. 8 can operate in any long play mode to provide a track pattern similar to that shown in FIG. 10. Further, the changeover period may be changed to k×H, k being an integer larger than two.

In the embodiment of FIG. 8 the number of channels is three, but it is possible to achieved the same effects as described when the number of channels is more than three.

Figure 11:
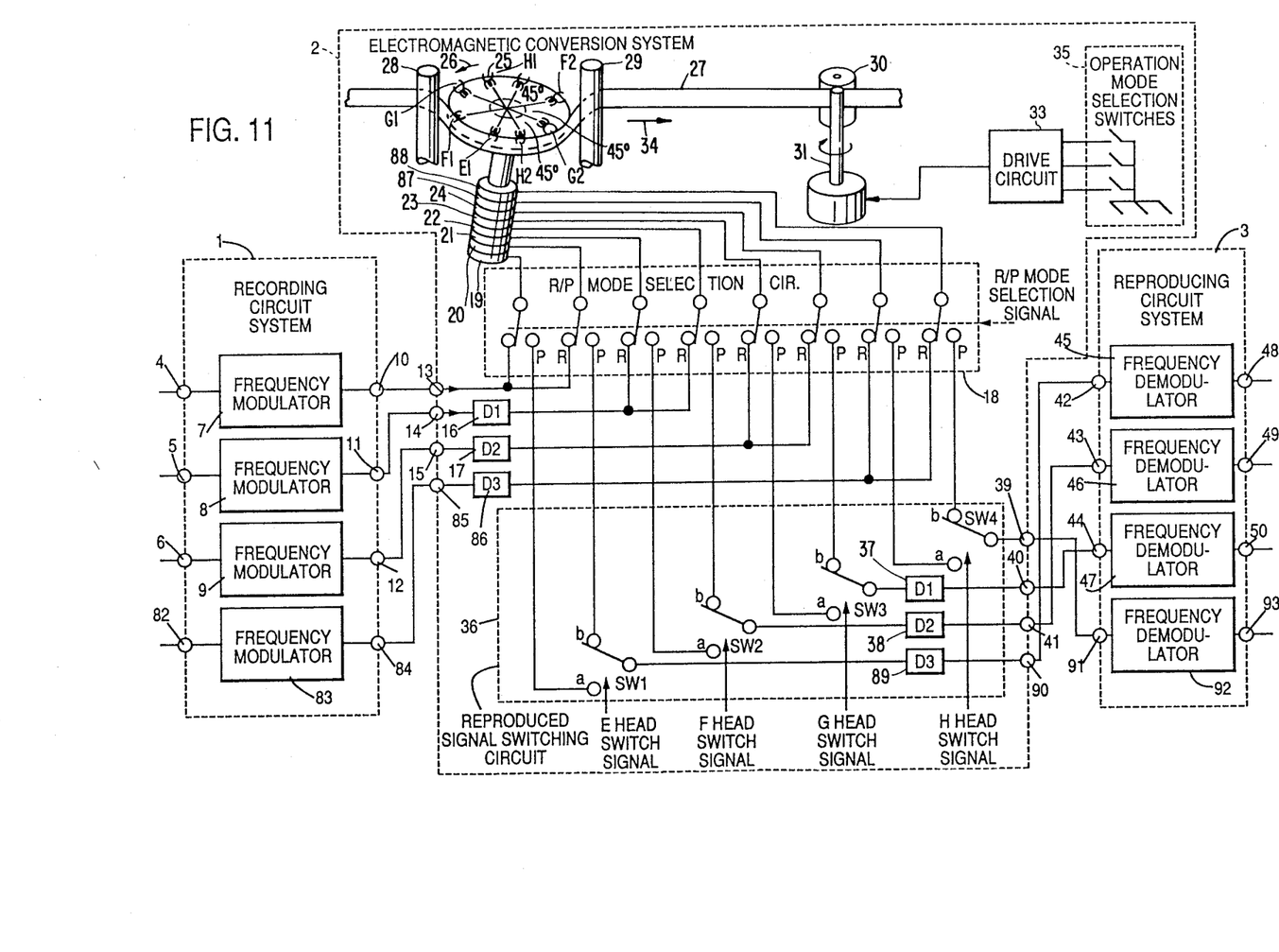
FIG. 11 is a schematic block diagram showing a four-channel component VTR embodying the present invention.

FIG. 11 shows still another embodiment of the present invention which is a four-channel component VTR. Here four channel signals are, for example, a luminance signal Y'(odd), a luminance signal Y'(even), a chrominance difference signal (R-Y) and a chrominance difference signal (B-Y). Here four channel signals are respectively inputted to input terminals 4, 5, 6 and 82, and are frequency-modulated by frequency modulators 7, 8, 9 and 83. The obtained FM four-channel signals are applied through terminals 10, 11, 12 and 84 to input terminals 13, 14, 15 and 85 of the electromagnetic conversion system 2.

In a recording mode, changeover switches of a record/playback (R/P) mode selection circuit 18 select R terminals in response to an externally given R/P mode selection signal. Accordingly, the FM Y'(odd) signal passes through the R/P mode selection circuit 18 to be applied to a pair of magnetic heads E1 and E2 via rotary transformers 19 and 20 which are mounted on a rotary shaft of a rotary cylinder 25. The FM Y'(even) signal is delayed for (¼)H by a delay circuit (D1) 16, and thereafter passes through the R/P mode selection circuit 18 to be applied to another pair of magnetic heads F1 and F2 via rotary transformers 21 and 22 which are mounted on the rotary shaft of the rotary cylinder 25. The FM (R-Y) signal is delayed for (½)H by a delay circuit (D2) 17, and thereafter passes through the R/P mode selection circuit 18 to be applied to still another pair of magnetic heads G1 and G2 via rotary transformers 23 and 24 which are mounted on the rotary shaft of the rotary cylinder. The FM (B-Y) signal is delayed for (¾)H by a delay circuit (D3) 86, and thereafter passes through the R/P mode selection circuit 18 to be applied to still another pair of magnetic heads H1 and H2 via rotary transformers 87 and 88 which are mounted on the rotary shaft of the rotary cylinder.

A magnetic tape 27 is driven by a capstan 31 rotated by a capstan motor 32 and a pinch roller 30 to move in direction 34. The speed of the capstan motor 32 is controlled by a drive circuit 33 according to an operation mode selection signal from operation mode selection switches 35 to change the moving speed of the magnetic tape 27. The magnetic tape 27 is guided by guide posts 28 and 29 to be wound on the rotary cylinder 25 in an angle of about 180 degrees.

Referring to the arrangement of the magnetic heads on the rotary cylinder 25, the heads E1 and E2 are spaced apart by 180 degrees from each other, the heads F1 and F2 are spaced apart by 180 degrees from each other, the heads G1 and G2 are spaced apart by 180 degrees from each other, and the heads H1 and H2 are spaced apart by 180 degrees from each other. The heads E1 and F1 are spaced apart by 45 degrees from each other. The heads F1 and G1 are spaced apart by 45 degrees from each other. The heads G1 and H1 are spaced apart by 45 degrees from each other. All of the eight heads E1, E2, F1, F2, G1, G2, H1 and H2 are at a same height, or rotate on a same plane. The heads E1, G1, E2 and G2 have a same azimuth ($\alpha$), and the heads F1, H1, F2 and H2 have another same azimuth ($\beta$) which is different from or preferably inverse ($-\alpha$) to that of the heads E1, G1, E2 and G2. Here, all of the eight heads E1, E2, F1, F2, G1, G2, H1 and H2 have a same width.

The rotary cylinder 25 turns a half rotation (180 degrees) in the direction 26 in a time corresponding to one field of the NTSC video signal, during which the magnetic tape 27 is moved for a distance 51 in a direction 34 as shown in a track pattern diagram in FIG. 5.

During first through fourth one-eighth (45 degrees) turns of the rotary cylinder 25, the magnetic head E1 scans the magnetic tape 27 to record the FM Y'(odd) signal in a first field in each frame. During second through fifth one-eighth (45 degrees) turns of the rotary cylinder 25, the magnetic head F1 scans the magnetic tape 27 to record the FM Y'(even) signal in second through fourth one-fourth of a first field and first one-fourth of a second field in each frame. During third through fifth one-eighth (45 degrees) turns of the rotary cylinder 25, magnetic head G1 scans the magnetic tape 27 to record the FM (R-Y) signal in third and fourth one-fourth of a first field and first and second one-fourth of a second field in each frame. During fourth through seventh one-eighth (45 degrees) turns of the rotary cylinder 25, the magnetic head H1 scans the magnetic tape 27 t record the FM (B-Y) signal in fourth one-fourth of a first field and first through third one-fourth of a second field in each frame. During fifth through eighth one-eighth (45 degrees) turns of the rotary cylinder 25, the magnetic head E2 scans the magnetic tape 27 to record the FM Y'(odd) signal in a second field in each frame. During sixth through next first one-eighth (45 degrees) turns of the rotary cylinder 25, the magnetic head F2 scans the magnetic tape 27 to record the FM Y'(even) signal in second through fourth one-fourth of a second field and first one-fourth of a first field in each frame. During seventh through next second one-eighth (45 degrees) turns of the rotary cylinder 25, magnetic head G2 scans the magnetic tape 27 to record the FM (R-Y) signal in third and fourth one-fourth of a second field and first and second one-fourth of a first field in each frame. During eighth through third one-eighth (45 degrees) turns of the rotary cylinder 25, the magnetic head H2 scans the magnetic tape 27 to record the FM (B-Y) signal in fourth one-fourth of a second field and first through third one-fourth of a first field in each frame.

In the playback mode, the recorded signals are reproduced by the same heads as those used for recording. The changeover switches of the R/P mode selection circuit 18 select P terminals in response to the R/P mode selection signal. Accordingly, the reproduced signals from the heads E1, E2, F1, F2, G1, G2, H1 and H2 pass through the R/P mode selection circuit 18 and are applied to a reproduced signal switching circuit 36.

A changeover switch SW1 in the switching circuit 36 is responsive to an externally given E-head switch signal which indicates which one of the heads E1 and E2 is scanning the magnetic tape for operating in such a way to select a terminal 'a' in a first field of each frame to pass the reproduced FM Y'(odd) signal from the head E1 and a terminal 'b' in a second field to pass the reproduced FM Y(even) signal from the head E2. A changeover switch SW2 in the switching circuit 36 is responsive to an externally given F-head switch signal which indicates which one of the heads F1 and F2 is scanning the magnetic tape for operating in such a way 'a' terminal in second through fourth one-fourth of a first field and first one-fourth of a second field to pass the reproduced FM Y'(even) signal from the head F1 and a terminal 'b' in second through fourth one-fourth of a second field and first one-fourth of a next first field to pass the reproduced FM Y'(even) signal from the head F2. A changeover switch SW3 in the switching circuit 36 is responsive to an externally given G-head switch signal which indicates which one of the heads G1 and G2 is scanning the magnetic tape for operating in such a way to select 'a' terminal in a third and fourth one-fourth of a first field and first and second one-fourth of second field to pass the reproduced FM (R-Y) signal from the head G1 and a terminal 'b' in third and fourth one-fourth of a second field and first and second one-fourth of a next first field to pass the reproduced FM (R-Y) signal from the head G2. A changeover switch SW4 in the switching circuit 36 is responsive to an externally given H-head switch signal which indicates which one of the heads H1 and H2 is scanning the magnetic tape for operating in such a way to select 'a' terminal in a fourth one-fourth of a first field and first through third one-fourth of second field to pass the reproduced FM (B-Y) signal from the head H1 and a terminal 'b' in fourth one-fourth of a second field and first through third one-forth of a next first field to pass the reproduced FM (B-Y) signal from the head H2. As well known, an externally given H-head switch signal is produced by the VTR system controller.

The reproduced FM Y'(odd) signal passed through the switch SW1 is delayed for ($\frac{1}{4}$)H by a delay circuit 89, and outputted from an output terminal 90 of the electromagnetic conversion system 2. The reproduced FM Y'(even) signal passed through the switch SW2 is delayed for ($\frac{1}{4}$)H by a delay circuit 38, and outputted from an output terminal 41 of the electromagnetic conversion system 2. The reproduced FM (R-Y) signal passes through the switch SW3 is delayed for ($\frac{3}{4}$)H by a delay circuit 37, and outputted from an output terminal 40 of the electromagnetic conversion system 2.

The FM Y'(odd) signal outputted from the electromagnetic conversion system 2 is inputted to an input terminal 42 of the reproducing circuit system 3, and frequency-demodulated by a frequency demodulator 45 to be a reproduced Y'(odd) signal, which is outputted from an output terminal 48. The FM Y'(even) signal outputted from the electromagnetic conversion system 2 is inputted to an input terminal 43 of the reproducing circuit system 3, and frequency-demodulated by a frequency demodulator 46 to be a reproduced Y'(even) signal, which is outputted from an output terminal 49. The FM (R-Y) signal outputted from the electromagnetic conversion system 2 is inputted to an input terminal 44 of the reproducing circuit system 3, and frequency-demodulated by a frequency demodulator 47 to be a reproduced (R-Y) signal, which is outputted from an output terminal 50. The FM (B-Y) signal outputted from the electromagnetic conversion system 2 is inputted to an input terminal 91 of the reproducing circuit system 3, and frequency-demodulated by a frequency demodulator 92 to be a reproduced (B-Y) signal, which is outputted from an output terminal 93.

In the electromagnetic conversion system 2, the four FM signals are recorded on the magnetic tape in the same way as described in connection with the embodiment of FIG. 1. The embodiment in FIG. 11 can not only operate in a standard mode but also in a long play mode to provide a similar track pattern in the same way as described in connection with the embodiment of FIG. 1.

What is claimed is:

1. An apparatus for recording three-channel component signals of a video signal on a magnetic tape and for reproducing three-channel component signals of a video signal recorded on a magnetic tape, said apparatus comprising:

recording signal processing means for processing said three-channel component signals into first, second and third recordable signals;

electromagnetic conversion means comprising: first, second and third pairs of magnetic heads for recording said first, second and third recordable signals, respectively, on the magnetic tape and for reproducing first, second and third recorded signals, respectively, from the magnetic tape; delay means for delaying only said second and third recordable signals of said first, second and third recordable signals for predetermined periods of time, respectively, before being recorded on the magnetic tape so that each horizontal synchronizing signal is recorded to be adjacent to another horizontal synchronizing signal in a direction perpendicular to a head moving direction on the magnetic tape; and another delay means for delaying only the reproduced first and second recorded signals of the reproduced first, second and third recorded signals for said predetermined periods of time so as to compensate for time differences caused by the delay of said second and third recordable signals; said three pairs of heads being mounted on a circumference of a rotary cylinder so as to be disposed in a rotating direction of said rotary cylinder at substantially constant intervals of 60 degrees with each pair of heads of said three pairs being disposed to be apart by substantially 180 degrees from each other, relative heights of the heads in each pair of said three pairs of heads in an axial direction of said rotary cylinder being substantially the same, and the widths of said three pairs of heads being substantially the same; and reproduced signal processing means for processing the reproduced first, second and third recorded signals to obtain reproduced three-channel component signals.

2. An apparatus according to claim 1, wherein each adjacent two heads of said three pairs of heads have different azimuth angles from each other.

3. An apparatus according to claim 1, wherein said predetermined periods of time are H/3 and 2 H/3, where H is one horizontal scanning period.

4. An apparatus for recording three-channel component signals of a video signal on a magnetic tape and for reproducing three-channel component signals of a video signal recorded on a magnetic tape, said apparatus comprising:

recording signal processing means comprising: first switch means for periodically replacing each of said three-channel component signals by one of the other two of said three-channel component signals to obtain three-channel combined signals each containing a sequence of said three-channel component signals which occurs periodically at a period of mH, where m denotes any integer and H denotes one horizontal scanning period; and means for processing said three-channel combined signals into first, second and third recordable signals, respectively;

electromagnetic conversion means comprising: first, second and third pairs of magnetic heads for recording said first, second and third recordable signals, respectively, on the magnetic tape and for reproducing first, second and third recorded signals, respectively, from the magnetic tape; delay means for delaying only said second and third recordable signals of said first, second and third recordable signals for predetermined periods of time, respectively, before being recorded on the magnetic tape so that each horizontal synchronizing signal is recorded to be adjacent to another horizontal synchronizing signal in a direction perpendicular to a head moving direction on said magnetic tape; and another delay means for delaying only the reproduced first and second recorded signals of the reproduced first, second and third recorded signals for said predetermined periods of time so as to compensate for time differences caused by the delay of said second and third recordable signals; said three pairs of heads being mounted on a circumference of a rotary cylinder so as to be disposed in a rotating direction of said rotary cylinder at substantially constant intervals of 60 degrees with each pair of heads of said three pairs being disposed to be apart by substantially 180 degrees from each other, relative heights of the heads in each pair of said three pairs of heads in an axial direction of said rotary cylinder being substantially the same, and the widths of said three pairs of heads being substantially the same; and reproduced signal processing means comprising: means for processing the reproduced signals from said electromagnetic conversion means to obtain reproduced three-channel combined signals; and second switch means for periodically replacing each of the reproduced three-channel combined signals to obtain reproduced three-channel component signals.

5. An apparatus according to claim 4, wherein said three-channel component signals are an odd-line luminance signal, an even-line luminance signal and a chrominance signal.

6. An apparatus according to claim 4, wherein each adjacent two heads of said three pairs of heads have different azimuth angles from each other.

7. An apparatus according to claim 4, wherein said predetermined periods of time are H/3 and 2 H/3.

8. An apparatus for recording N-channel component signals of a video signal, where N is an integer larger than two, on a magnetic tape and for reproducing recorded signals from a magnetic tape, said apparatus comprising:

recording signal processing means for processing said N-channel component signals into N recordable signals;

electromagnetic conversion means including: N pairs of magnetic heads for recording said N recordable signals, respectively, on the magnetic tape and for reproducing said N recorded signals, respectively, from the magnetic tape; delay means for delaying (N-1) recordable signals except for a first recordable signal of said N recordable signals for predetermined periods of time, respectively, before being recorded on the magnetic tape so that each horizontal synchronizing signal is recorded to be adjacent to another horizontal synchronizing signals in a direction perpendicular to a head moving direction on the magnetic tape; and another delay means for delaying (N-1) reproduced signals except an N-th recordable signal of the N-reproduced signals for said predetermined periods of time so as to compensate for time differences caused by the delay of said (N-1) recordable signals; said N pairs of heads being mounted on a circumference of a rotary cylinder so as to disposed in a rotating direction of said rotary cylinder at substantially constant intervals (180/N) degrees with each pair of heads of said N pairs being disposed to be apart by substantially 180 degrees from each other, relative heights of the heads in each pair of said N pairs of heads in an axial direction of said rotary cylinder being substantially the same, and widths of said N pairs of heads being substantially the same; and reproduced signal processing means for processing said N reproduced signals to obtain reproduced N-channel component signals.

9. An apparatus according to claim 8, wherein each adjacent two heads of said N pairs of heads have different azimuth angles from each other.

10. An apparatus according to claim 8, wherein a time period of said predetermined periods of time for delaying a I-th recordable signal of the N recordable signals is I×H/N, where H is one horizontal scanning period and I is a positive integer smaller than N.

11. An apparatus for recording N-channel component signals of a video signal, where N is an integer larger than two, on a magnetic tape and for reproducing N recorded signals from a magnetic tape, said apparatus comprising:

recording signal processing means comprising: first switch means for periodically replacing each of said N-channel component signals by one of the other (N-1) of said N-channel component signals to obtain N-channel combined signals each containing a sequence of said N-channel component signals which occurs periodically at a period of mH, where m denotes any positive integer and H denotes one horizontal scanning period; and means for processing said N-channel combined signals into N recordable signals, respectively;

electromagnetic conversion means comprising: N pairs of magnetic heads for recording said N recordable signals, respectively, on the magnetic tape and for reproducing said N recorded signals, respectively, from the magnetic tape; delay means for delaying (N-1) recordable signals except for a first recordable signal of said N recordable signals for predetermined periods of time respectively, before being recorded on the magnetic tape so that each horizontal synchronizing signal is recorded to be adjacent to another horizontal synchronizing signal in a direction perpendicular to a head moving direction of the magnetic tape; and another delay means for delaying (N-1) reproduced signals except an N-th reproduced signal of the N reproduced signals for said predetermined periods of time so as to compensate of the time differences caused by the delay of said (N-1) recordable signals, said N pairs of heads being mounted on a circumference of a rotary cylinder so as to be disposed in a rotating direction of said rotary cylinder at substantially constant intervals of (180/N) degrees with each pair of heads of said N pairs being disposed to be apart by substantially 180 degrees from each other, relative heights of the heads in each pair of said N pairs of heads in an axial direction of said rotary cylinder being substantially the same, and widths of said N pairs of heads being substantially the same; and reproduced signal processing means comprising: means for processing the N reproduced signals from said electromagnetic conversion means to obtain reproduced N-channel combined signals; and second switch means for periodically replacing each of the reproduced N-channel combined signals to obtain reproduced N-channel component signals.

12. An apparatus according to claim 11, wherein each two adjacent heads of said N pairs of heads have different azimuth angles from each other.

13. An apparatus according to claim 11, wherein a time period of said predetermined periods of time for delaying an I-th recordable signal of the N recordable signals is $I \times H/N$, where H is one horizontal scanning time and I is a positive integer smaller than N.

* * * * *